(12) United States Patent
Jang et al.

(10) Patent No.: US 9,533,773 B1
(45) Date of Patent: Jan. 3, 2017

(54) METHODS AND SYSTEMS FOR AUTOMATED VEHICLE ASSET TRACKING

(75) Inventors: Jung Soon Jang, Seattle, WA (US); Dorina L. Hester, Seattle, WA (US)

(73) Assignee: The Boeing Company, Chicago, IL (US)

( * ) Notice: Subject to any disclaimer, the term of this patent is extended or adjusted under 35 U.S.C. 154(b) by 498 days.

(21) Appl. No.: 13/459,668

(22) Filed: Apr. 30, 2012

(51) Int. Cl.
*B64F 5/00* (2006.01)

(52) U.S. Cl.
CPC ............ *B64F 5/0045* (2013.01); *Y10S 901/44* (2013.01)

(58) Field of Classification Search
CPC .... Y10S 901/00; Y10S 901/44; B64F 5/0036; B64F 5/0045; B64F 5/00
See application file for complete search history.

(56) References Cited

U.S. PATENT DOCUMENTS

| | | | | |
|---|---|---|---|---|
| 6,637,266 | B1 * | 10/2003 | Froom | 73/583 |
| 6,882,315 | B2 * | 4/2005 | Richley et al. | 342/465 |
| 8,423,225 | B2 * | 4/2013 | Hillman, Jr. | G05D 1/0246 700/259 |
| 8,447,863 | B1 * | 5/2013 | Francis et al. | 709/226 |
| 8,918,208 | B1 * | 12/2014 | Hickman | B25J 9/1602 700/1 |
| 9,026,301 | B2 * | 5/2015 | Zini | G05B 19/41895 700/245 |
| 9,205,886 | B1 * | 12/2015 | Hickman | B25J 9/1697 |
| 2005/0113975 | A1 * | 5/2005 | Seemann | 700/245 |
| 2007/0139191 | A1 * | 6/2007 | Quatro | 340/539.13 |
| 2009/0077214 | A1 * | 3/2009 | Buster et al. | 709/223 |
| 2009/0149202 | A1 * | 6/2009 | Hill et al. | 455/456.6 |
| 2010/0121517 | A1 * | 5/2010 | Lee | G05D 1/0214 701/25 |
| 2010/0217438 | A1 * | 8/2010 | Kawaguchi | B25J 9/1661 700/248 |
| 2011/0006912 | A1 * | 1/2011 | Sheardown et al. | 340/901 |
| 2012/0081540 | A1 * | 4/2012 | Jang | B64F 5/0045 348/128 |
| 2012/0182392 | A1 * | 7/2012 | Kearns | B25J 11/009 348/46 |
| 2012/0239333 | A1 * | 9/2012 | Keene et al. | 702/94 |
| 2012/0291810 | A1 * | 11/2012 | Chen | G05D 1/0234 134/18 |
| 2012/0303154 | A1 * | 11/2012 | Stiernagle | 700/214 |
| 2012/0306666 | A1 * | 12/2012 | Xu | B64F 5/0045 340/945 |
| 2013/0145850 | A1 * | 6/2013 | Lute et al. | 73/619 |

(Continued)

OTHER PUBLICATIONS

Mililer, Thomas H. et al., "An Automated Asset Locating System (AALS) with Applications to Inventory Management."

*Primary Examiner* — Mussa A Shaawat
(74) *Attorney, Agent, or Firm* — Armstrong Teasdale LLP

(57) ABSTRACT

Methods and systems for automated asset tracking within an aircraft are disclosed. In one example, a method for use in automated tracking of assets in a vehicle utilizing a robotic vehicle is provided. The method includes receiving inspection data concerning the vehicle and the assets. A navigation path is generated thorough the vehicle. The robotic vehicle traverses the navigation path and locates at least one asset with the vehicle along the navigation path. An identification of the asset located within the vehicle is transmitted to a remote computing device and stored in a database associated with the remote computing device.

19 Claims, 8 Drawing Sheets

(56) References Cited

U.S. PATENT DOCUMENTS

| | | | |
|---|---|---|---|
| 2013/0204430 A1* | 8/2013 | Davey et al. | 700/216 |
| 2013/0226344 A1* | 8/2013 | Wong | G05D 1/024 |
| | | | 700/258 |
| 2013/0261876 A1* | 10/2013 | Froom et al. | 701/29.3 |
| 2014/0350725 A1* | 11/2014 | LaFary | G06N 3/008 |
| | | | 700/253 |

* cited by examiner

METHODS AND SYSTEMS FOR AUTOMATED VEHICLE ASSET TRACKING

BACKGROUND

The field of the disclosure relates generally to automated asset tracking, and more specifically to methods and systems for automated asset tracking within a vehicle.

Vehicles, such as aircraft, spacecraft, busses, trains, ships, and space stations, often contain many assets within the vehicle that are periodically inventoried, upgraded, and/or replaced. For example, the passenger cabin of a commercial, passenger aircraft often includes numerous items of safety equipment that are inventoried frequently, e.g., after every flight. These assets can include several different types of equipment such as, for example, fire extinguishers, medical kits, flotation devices, and flashlights. The number of pieces of each type of equipment may vary between types of equipment. For example, there may be many more flotation devices than medical kits. Moreover, the number of pieces of equipment of any type of equipment may vary depending on the particular aircraft. For example, the number of pieces of equipment may depend on the maximum number of passengers that the aircraft can transport. Thus, aircraft with larger passenger capacities may include greater numbers of one or more types of equipment. Moreover, the types of equipment may vary depending on the type of aircraft, the types of uses of the aircraft, the operator of the aircraft, etc. Additionally, some of the assets may require periodic maintenance, inspection, replacement, etc. For example, fire extinguishers need to be checked, maintained, and/or replaced periodically. The frequency with which assets need inspection, maintenance, replacement, etc. will often differ from the frequency of inventorying the assets.

Currently, inventorying of assets in vehicles is commonly performed manually. One or more persons traverse through a vehicle and visually check for the expected assets within the vehicle. In a commercial, passenger aircraft for example, flight attendants walk through the passenger cabin visually searching for each flotation device, fire extinguisher, medical kit, flashlight, etc. The flight attendants record the total number of each type of asset located to ensure that the correct number of each type of equipment is located within the aircraft. This record of the inventory may be made on a paper checklist or a computerized checklist. In some operations, the flight attendants may also check assets to determine whether maintenance, repair, or replacement of any asset is needed. For example, the flight attendant may check a maintenance tag attached to a fire extinguisher, a date of manufacture displayed on a flotation device, expiration dates on items in medical kit, etc. In other operations, such inspections may be part of a separate procedure or may be based on data regarding the particular assets in a particular aircraft stored in a remote database. Such manual inspection and inventory procedures may be time consuming, labor intensive, and/or subject to human error.

BRIEF DESCRIPTION

According to one aspect of the present disclosure, a method for use in automated tracking of assets in a vehicle utilizing a robotic vehicle is provided. The method includes receiving inspection data concerning the vehicle and the assets, generating a navigation path through the vehicle, traversing the navigation path, locating at least one asset within the vehicle along the navigation path, transmitting an identification of the at least one asset located within the vehicle to a remote computing device, and storing the identification of the at least one asset in a database associated with the remote computing device.

In another aspect, a system for tracking assets in a vehicle is provided. The system includes a robotic vehicle. The robotic vehicle includes a navigation system, an asset location system, a communications interface, and a computing device coupled to the navigation system, the asset location system, and the communications interface. The computing device is programmed to receive inspection data concerning the vehicle and assets via the communications interface, traverse a navigation path through the vehicle using the navigation system, locate at least one asset within the vehicle along the navigation path using the asset location system, and transmit an identification of the at least one asset located within the vehicle to a remote computing device using the communications interface for storage in a database associated with the remote computing device.

In yet another aspect, a method of a robotic vehicle for use in automated tracking of assets in a vehicle is provided. The robotic vehicle includes a robotic platform configured to permit the robotic vehicle to move within an environment, a navigation system mounted to the robotic platform to guide the robotic platform within the vehicle, an asset identification system mounted to the robotic platform to identify a plurality of assets within the vehicle, a communications interface mounted to the robotic platform for communicating with a remote computing device, and a computing device mounted to the robotic platform and coupled to the navigation system, the asset identification system, and the communications interface. The computing device is programmed to cause the robotic platform to navigate a navigation path through the vehicle, to use the identification system to identify at least one asset of the plurality of assets, and to use the communications interface to transmit an identification of the at least one asset to the remote computing device for storage in a database associated with the remote computing device.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Exemplary methods and systems for automated asset tracking within a vehicle are described herein. The methods and systems described herein may permit less labor intensive inventorying of assets within a vehicle. In some embodiments, a robotic vehicle supervised by a single operator is used to inventory assets located within the vehicle. Thus, multiple humans may not be needed to inventory assets within a vehicle. Moreover, some exemplary systems and methods may provide more accurate inventories than human performed inventories through the use of a robotic vehicle electronically identifying assets within the vehicle. Moreover, maintenance, repair, and/or expiration data information may be retrieved from the assets or from a remote database substantially simultaneously with the location of the assets within the vehicle. Furthermore, useful data, such as inventory results, maintenance data, repair data, etc., may be generated, stored, and/or retrieved in exemplary embodiments of the methods and systems described herein.

Exemplary methods and systems for automated asset tracking within a vehicle are generally described herein with reference to an aircraft. The methods and systems described herein may be used, however, in conjunction with any suitable vehicle including, without limitation, trains, busses, ships, spacecraft, and space stations.

Figure 1:
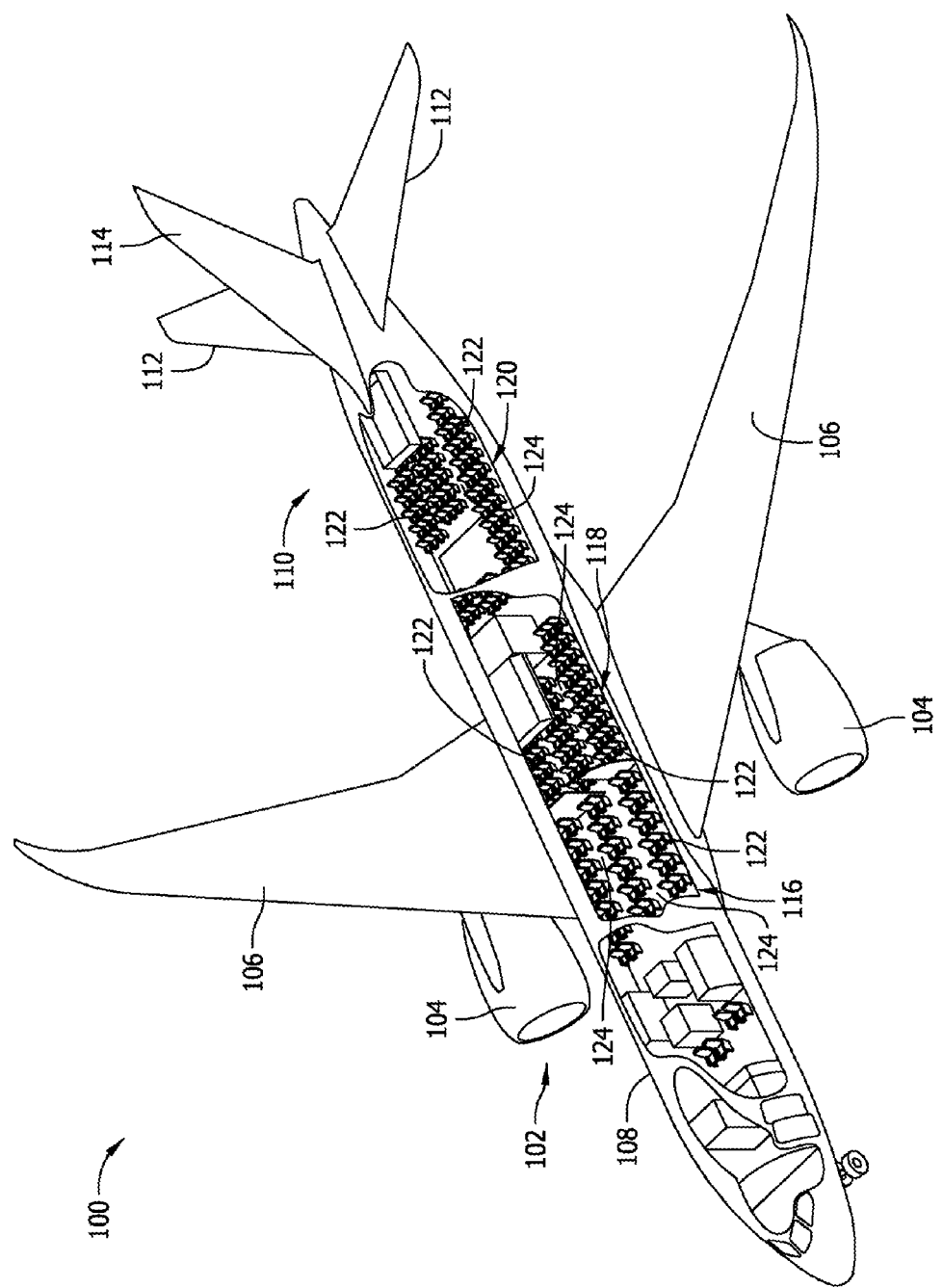
FIG. 1 is a partial cutaway view of an aircraft.

Referring to the drawings, FIG. 1 is a partial cutaway view of an aircraft, generally indicated by reference number 100. In the exemplary embodiment, aircraft 100 has a propulsion system 102. Propulsion system 102 includes two engines 104. Other embodiments may include more or fewer engines 104. Moreover, some embodiments may include other and/or different motors, engines, etc. In the particular embodiment shown in FIG. 1, engines 104 are carried by wings 106 of aircraft 100. In other embodiments, engines 104 can be carried by fuselage 108 and/or empennage 110. Empennage 110 also includes horizontal stabilizers 112 and a vertical stabilizer 114. Aircraft 100 includes three passenger compartments 116, 118, and 120 within fuselage 108. Other embodiments may include more or fewer passenger compartments and/or differently arranged passenger compartments. In general, each passenger compartment includes a plurality of seats 122 and one or more aisles 124 between two groups of seats 122.

Figure 2:
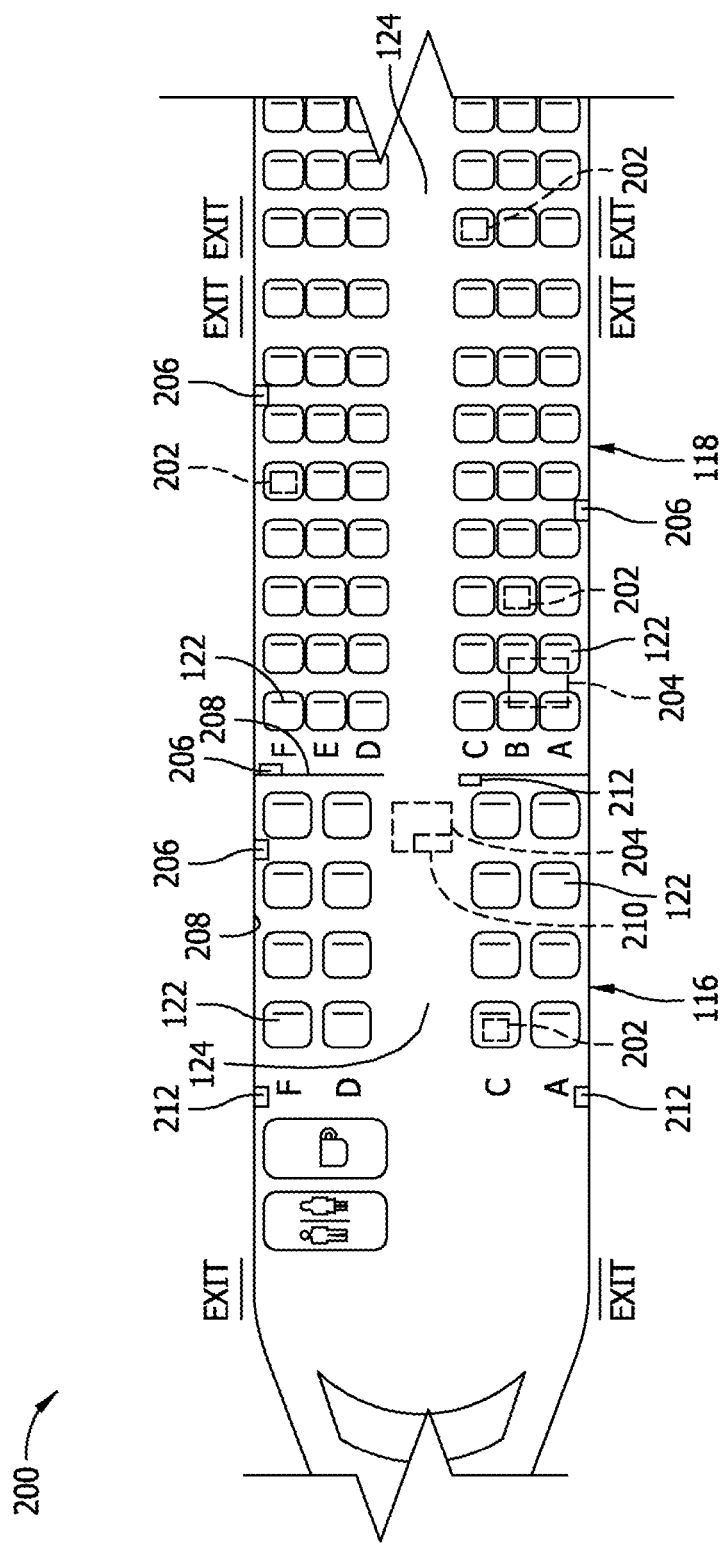
FIG. 2 is a simplified diagram of a portion of the interior of an aircraft similar to the aircraft shown in FIG. 1.

FIG. 2 is a simplified diagram of a portion of the interior of an aircraft 200 similar to aircraft 100. The portion of aircraft 200 shown in FIG. 2 includes two passenger compartments 116 and 118, each having seats 122 separated by aisles 124. FIG. 2 shows several assets 202, 204, and 206 positioned throughout compartments 116 and 118 of aircraft 200. Other embodiments may include more or fewer assets 202, 204, and/or 206. In the exemplary embodiment, assets 202, 204, and 206 are safety equipment. Assets 202, 204, and 206 may include, for example, flotation devices, medical kits, fire extinguishers, and/or flashlights. In other embodiments, assets may be any other suitable equipment.

Assets 202 are under-seat assets positioned throughout aircraft 200. Assets 202 are any assets that may be positioned or affixed underneath a seat 122. Each under-seat asset 202 may be the same type of asset or of a different type of asset as the other under-seat assets 202. Moreover, in some embodiments, each seat may include at least one under-seat asset 202, and some seats 122 (including optionally all seats 122) may include more than one under-seat asset 202. In some embodiments, under-seat assets 202 include assets located beneath a floor on which seats 122 rest. Overhead assets 204 are assets stored above seats 122 and/or aisles 202. For example, overhead assets 204 may be stored in an overhead luggage compartment or a ceiling storage panel. Assets 206 are mounted to, or stored in a compartment within walls 208 of aircraft 200.

Although not illustrated on each asset 202, 204, and 206 shown in FIG. 2, each asset 202, 204, and 206 includes an identification tag 210 attached thereto. In the exemplary embodiment, identification tags 210 are radio frequency identification (RFID) tags. More particularly, identification tags 210 are passive RFID tags in the exemplary embodiment. Passive RFID tags do not include a power source and transmit a signal only upon receiving radio frequency (RF) signals and energy emitted from a reader in proximity of the tag. In some embodiments, identification tags may include active RFID tags. Active RFID tags include their own power source, such as a battery, and actively broadcast their information. In other embodiments, identification tags 210 may be any other active or passive tag suitable for providing an identification of an asset 202, 204, or 206 to a device spaced apart from asset 202, 204, or 206. Identification tags 210 store identification data concerning the particular asset 202, 204, or 206 to which they are attached for transmission to an RFID transceiver (not shown in FIG. 2). In the exemplary embodiment, the identification data includes the type of item that the particular asset 202, 204, or 206 is (e.g., a medical kit, a fire extinguisher, a flotation device, or a flashlight). Each type of item may include sub-types. For example, the fire extinguisher type may be divided into subtypes based on size (small, medium, large, etc.), and/or suppressant types (water based, dry chemicals, foams, etc.). The identification data includes identification of the particular subtype, sub-subtype, etc. of assets 202, 204, or 206 as applicable. In some embodiments, the identification data specifies which particular item within a type asset 202, 204, or 206 is (e.g., medical kit number 001, medical kit number 002, etc.). The identification of the particular item may be any suitable identification such as, for example, a serial number or a number attached to the end of the type identifier. Moreover, in some embodiments, additional data may be stored on identification tags 210 such as manufactured date, expiration date, last maintenance date, etc.

In the exemplary embodiment, three location tags 212 are positioned at fixed, known locations within aircraft 200. Location tags 212 are RFID tags operable to transmit data to an RFID transceiver (not shown in FIG. 2). Location tags 212 may be used to orient within and/or navigate through aircraft 200. In other embodiments, more or fewer (including no) location tags 212 are included within aircraft 200.

Figure 3:
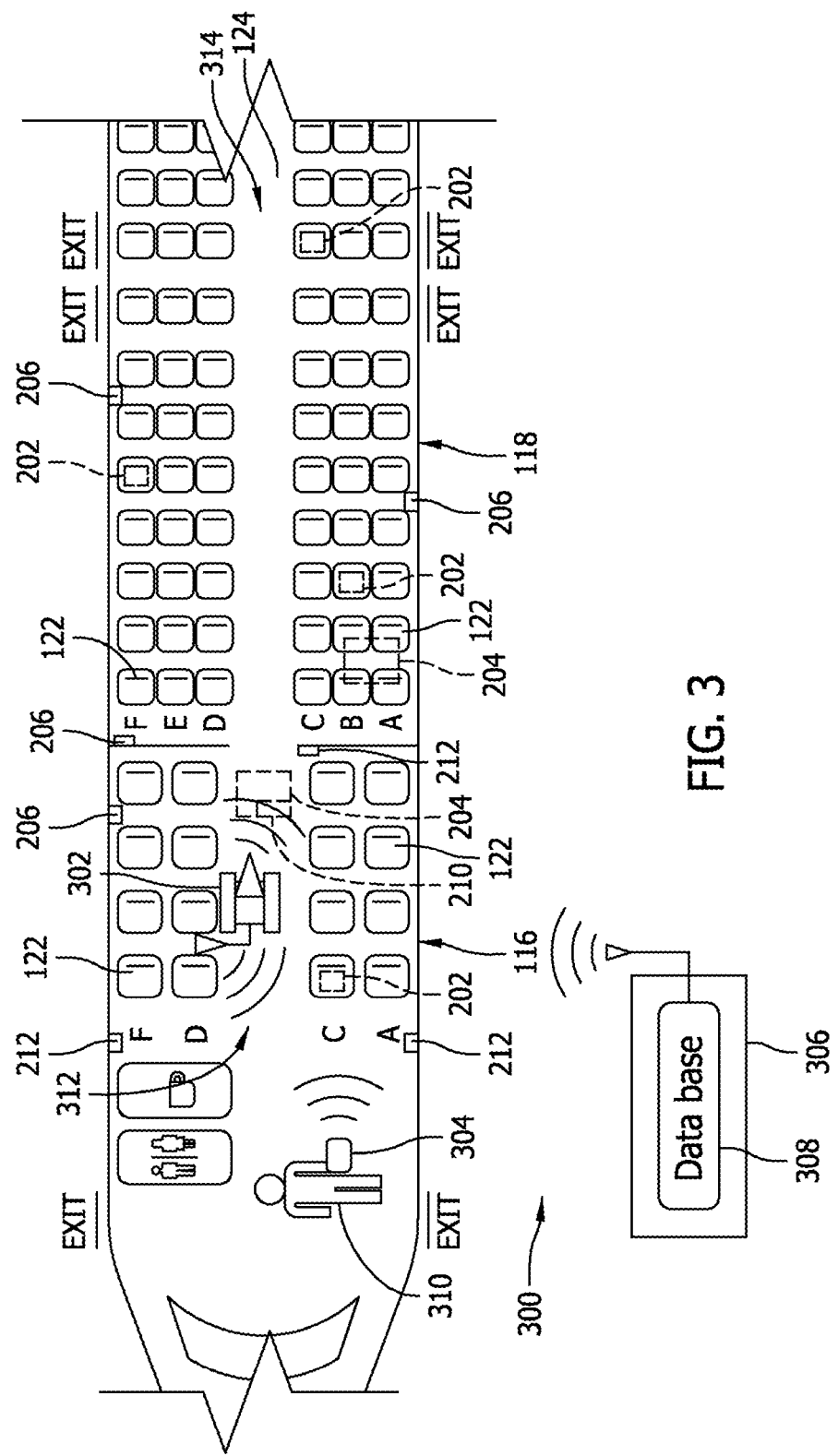
FIG. 3 is a simplified diagram of an exemplary system for tracking assets in a vehicle in accordance with the present disclosure.

FIG. 3 is a simplified diagram of a system 300 for tracking assets in a vehicle shown in association with aircraft 200. System 300 includes a robotic vehicle 302, a supervisory device 304, and a remote computing device 306. A database 308 is associated with remote computing device 306. In the exemplary embodiment, computing device 306 includes database 308. In other embodiments, database 308 may be partially or completely separate from computing device 306. Generally, robotic vehicle 302 traverses a navigation path through aircraft 200 while attempting to locate assets 202, 204, and 206 within vehicle 200. Other embodiments include more than one robotic vehicle 302. Each robotic vehicle 302 may traverse a navigation path through all or a portion of aircraft 200 attempting to locate assets 202, 204, and 206 as described herein. For example, a first robotic vehicle 302 may navigate first compartment 116, while a second robotic vehicle 302 navigates second compartment 118. Moreover, while described herein in terms of locating and inventorying assets 202, 204, and 206, the failure to locate assets is a useful aspect of some embodiments. For example, failure to locate an expected asset 202, 204, or 206 may indicate that the particular asset 202, 204, or 206 is missing and needs to be replaced. Alternatively, or additionally, system 300 may be used to confirm that a particular type of asset, or assets, have been removed from aircraft 200 (for example when aircraft 200 is being taken out of service).

Figure 4:
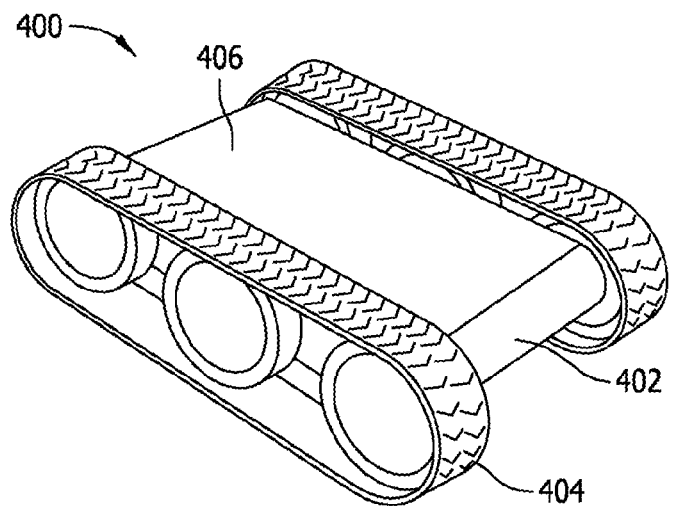
FIG. 4 is an isometric view of a robotic platform for use in the exemplary system shown in FIG. 3.
Figure 5:
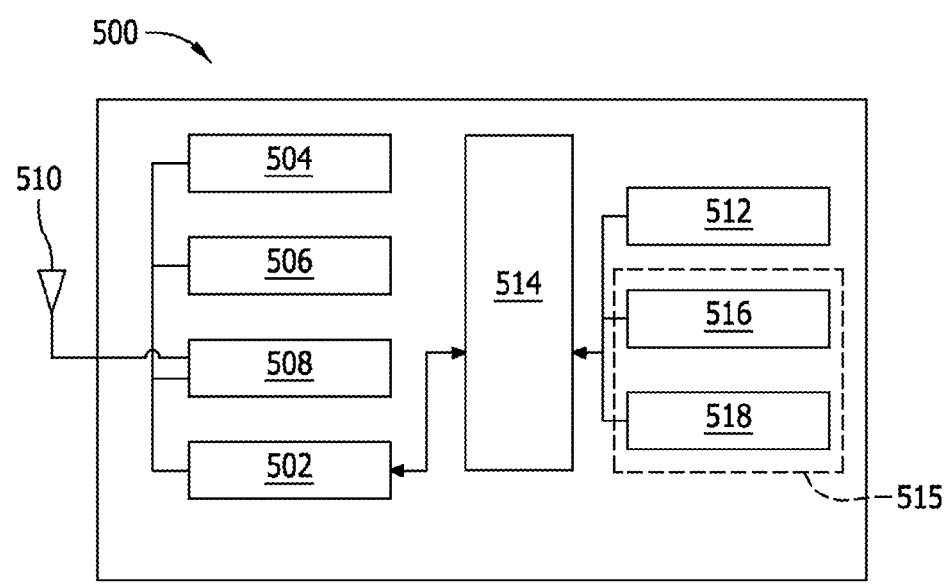
FIG. 5 is a block diagram of components mounted to the robotic platform shown in FIG. 4.

FIGS. 4 and 5 are illustrations of robotic vehicle 302. Specifically, FIG. 4 is an isometric view of a robotic platform 400, and FIG. 5 is a block diagram of components mounted to robotic platform 400.

With reference to FIG. 4, robotic platform 400 is a platform configured to permit robotic vehicle 302 to be motile within an environment. In the exemplary embodiment, robotic platform 400 includes a housing 402. A propulsion system 404 provides motive force to move robotic platform 400 through an environment. In the exemplary embodiment, propulsion system 400 is a treaded drive system. In other embodiments, propulsion system may include any other suitable system for moving robotic platform through an environment including, for example, wheels or legs. Housing 402 encloses additional components of propulsion system 403 such as motors, batteries, and gearboxes (not shown) and defines a platform 406 on which additional components of robotic vehicle 302 are mounted (not shown in FIG. 4).

FIG. 5 is a block diagram of additional components 500 that are mounted to robotic platform 400. In the exemplary embodiment, components 500 are mounted to platform 406. In other embodiments, one or more of components 500 are mounted elsewhere on robotic platform including, for example, within housing 402.

Components 500 include a computing device 502 mounted to robotic platform 406. As will be described in more detail below, computing device 502 is coupled to the other components 500 and is responsible for controlling operation of robotic vehicle 302 as described herein. A motor controller 504 operates the motor(s) of robotic platform 400 in response to instructions from computing device 502 to cause robotic platform 400 to move within its environment. A power management system 506 includes a voltage regulator and a battery monitor. Power management system regulates the voltage provided to components 500 and the motors of propulsion system 404 from the batteries within robotic platform 400 and monitors the status (e.g., amount of charge, voltage and current output, etc.) of the batteries. A communications interface 508 is mounted to the robotic platform to facilitate communication between computing device 502, supervisory device 304, and remote computing device 306. In the exemplary embodiment, communications interface 508 includes a wireless network transceiver (wireless network communication transceiver), e.g., a Wi-Fi transceiver. In other embodiments, any other suitable wired or wireless communications interface may be used. Communications interface 508 is coupled to an antenna 510 to transmit and receive wireless communications.

An asset identification system 512 remotely locates and identifies assets in the environment, e.g., within aircraft 200, in which robotic vehicle 302 is deployed. In the exemplary embodiment, asset identification system 512 includes an RFID transceiver, also sometimes referred to as an RFID reader or interrogator. The RFID transceiver emits electromagnetic radiation and receives reply signals from RFID tags, such as identification tags 210. In other embodiments, asset identification system 512 may include any other system suitable for remotely identifying assets within a vehicle. Asset identification system 512 is coupled in communication with computing device 502 via a digital to analog converter (DAC) 514. In other embodiments, asset identification system 512 includes a digital interface, such as a serial interface, an Ethernet interface, etc., that is connected to computing device directly. In still other embodiments, asset identification system 512 is wirelessly coupled to computing device 514, such as via Wi-Fi, Bluetooth®, or any other suitable wireless communication protocol. Upon identifying an asset, asset identification system 512 transmits the identification information received from the asset, or more specifically from identification tag 210, to computing device 502.

A navigation system 514 includes navigation sensors 516 and proximity sensors 518. In the exemplary embodiment, navigation sensors 516 include an inertial measurement unit (IMU), a differential wheel encoder, and exteroreceptive and/or vision sensors. The vision sensors may be monocular or stereo vision sensors. Alternatively, or additionally, any other suitable navigation sensors may be used including, for example, laser or light detection and ranging (LiDAR or LaDAR) systems. Proximity sensors 518 include sensors operable to detect an object proximate robotic vehicle 302. The detection of close objects facilitates the avoidance of collisions between robotic vehicle 302 and unexpected objects.

In the exemplary embodiment, a map of the environment in which robotic vehicle 302 is to be operated is transmitted to robotic vehicle 302 from supervisory device 304 and/or remote computing device 306. The map identifies the location of objects, structures, etc. within the environment, as well as the location of assets within the environment. For example, in the exemplary embodiment, the map transmitted to robotic vehicle 302 identifies the locations of seats 122, walls 208, location tags 212, and assets 202, 204, and 206. Computing device 502 determines a navigation path through aircraft 200 that will allow (e.g., will bring robotic vehicle 302 close enough to tags 210 to permit identification) asset identification system 512 to locate and identify all of the assets 202, 204, and 206 within aircraft 200. In other embodiments, a navigation path is created by supervisory device 304 and/or remote computing device 306. Computing device 502 operates robotic vehicle 302 using motor controller 504 to traverse the determined navigation path based on data received from navigation system 514.

Computing device 502 is programmed to determine its location within aircraft 200 based, at least in part, on its identification of the location tags 212 and/or assets 202, 204, and 206. Thus, in the exemplary embodiment, navigation along the navigation path is based, at least in part, on data received from asset identification system 512 in combination with the expected locations of location tags 212 and assets 202, 204, and 206 received from supervisory device 304 and/or remote computing device 306. Other embodiments do not utilize location tags 212 as an aid in the navigation.

Figure 6:
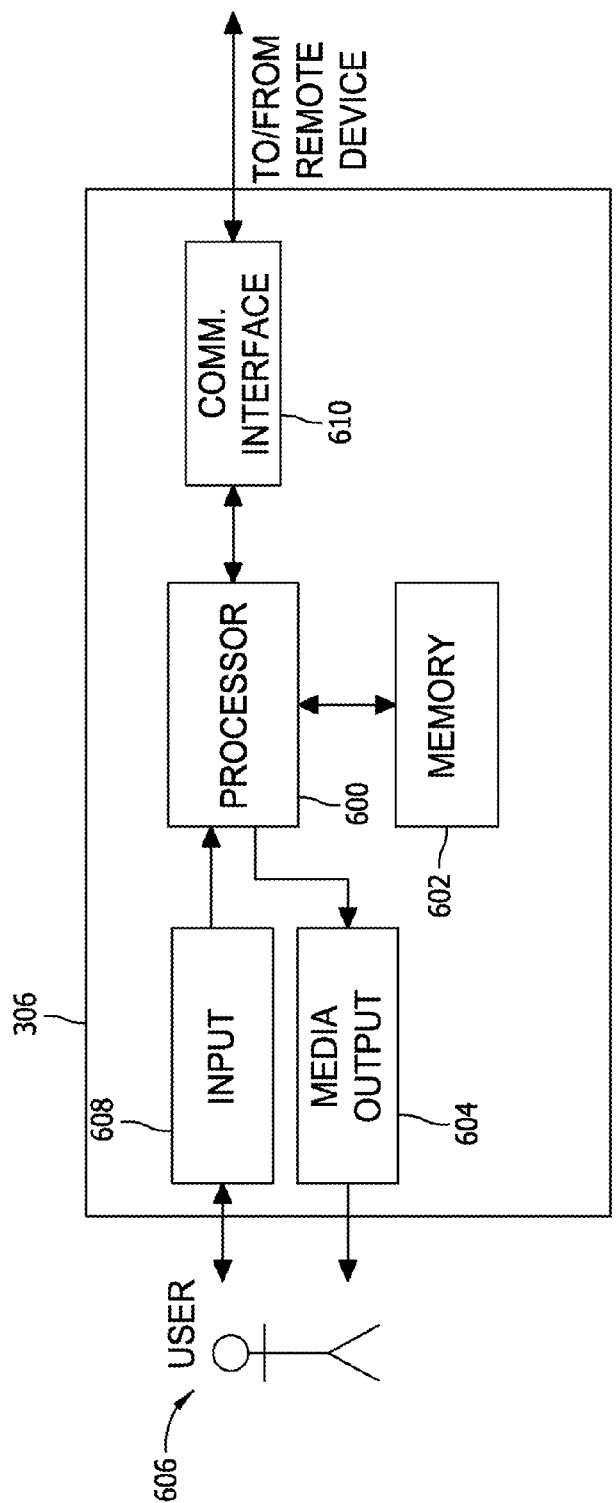
FIG. 6 is an exemplary configuration of remote computing device for use in the exemplary system shown in FIG. 3.

FIG. 6 illustrates an exemplary configuration of remote computing device 306. Remote computing device 306 includes a processor 600 for executing instructions. In some embodiments, executable instructions are stored in a memory area 602. Processor 600 may include one or more processing units (e.g., in a multi-core configuration). Memory area 602 is any device allowing information such as executable instructions and/or other data to be stored and retrieved. Memory area 602 may include one or more computer readable media. In the exemplary embodiment, database 308 (shown in FIG. 3) is stored in memory area 602. In other embodiments, database 308 is stored in a memory device other than memory area 602. In the exemplary embodiment, computer readable instructions to permit remote computing device 306 to operate as described herein are stored in memory area 602.

Remote computing device 306 also includes at least one media output component 604 for presenting information to a user 606. Media output component 604 is any component capable of conveying information to user 606. In some embodiments, media output component 604 includes an output adapter such as a video adapter and/or an audio adapter. An output adapter is operatively coupled to processor 600 and operatively couplable to an output device such as a display device (e.g., a liquid crystal display (LCD), organic light emitting diode (OLED) display, cathode ray tube (CRT), or "electronic ink" display) and/or an audio output device (e.g., a speaker or headphones).

In some embodiments, remote computing device 306 includes an input device 608 for receiving input from user 606. Input device 608 may include, for example, a keyboard, a scanner, a pointing device, a mouse, a stylus, a touch sensitive panel (e.g., a touch pad or a touch screen), a gyroscope, an accelerometer, a position detector, camera, or an audio input device. A single component such as a touch screen may function as both an output device of media output component 604 and input device 608. Moreover, in some embodiments, remote computing device 306 includes more than one input device 608 for receiving input from user 606. For example, computer device may include a keyboard, a touch sensitive panel, and a scanner.

Remote computing device 306 includes a communication interface 610, which is communicatively couplable to a remote device such as supervisory device 304 and/or robotic vehicle 302. Communication interface 610 may include, for example, a wired or wireless network adapter or a wireless data transceiver for use with a mobile phone network (e.g., Global System for Mobile communications (GSM), Code Division Multiple Access (CDMA), 3G, 4G or Bluetooth) or other mobile data network (e.g., Worldwide Interoperability for Microwave Access (WIMAX)).

Figure 7:
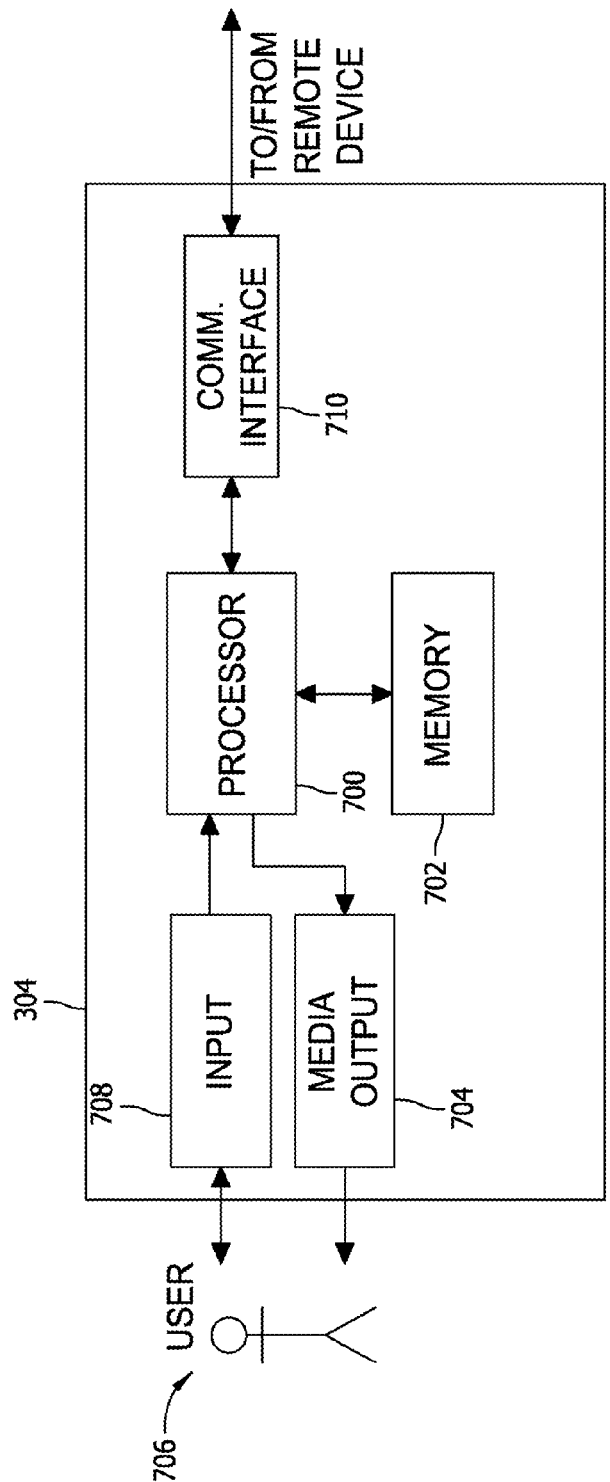
FIG. 7 is an exemplary configuration of supervisory device for use in the exemplary system shown in FIG. 3.

FIG. 7 illustrates an exemplary configuration of supervisory device 304. Supervisory device 304 includes a processor 700 for executing instructions. In some embodiments, executable instructions are stored in a memory area 702. Processor 700 may include one or more processing units (e.g., in a multi-core configuration). Memory area 702 is any device allowing information such as executable instructions and/or other data to be stored and retrieved. Memory area 702 may include one or more computer readable media. In the exemplary embodiment, computer readable instructions to permit supervisory device 304 to operate as described herein are stored in memory area 702.

Supervisory device 304 also includes at least one media output component 704 for presenting information to a user 706. Media output component 704 is any component capable of conveying information to user 706. In some embodiments, media output component 704 includes an output adapter such as a video adapter and/or an audio adapter. An output adapter is operatively coupled to processor 700 and operatively couplable to an output device such as a display device (e.g., a liquid crystal display (LCD), organic light emitting diode (OLED) display, cathode ray tube (CRT), or "electronic ink" display) and/or an audio output device (e.g., a speaker or headphones). In some embodiments, the output device is integrated with supervisory device 304. For example, in some embodiments, supervisory device 304 is a notebook computer or a tablet computer.

In some embodiments, supervisory device 304 includes an input device 708 for receiving input from user 706. Input device 708 may include, for example, a keyboard, a scanner, a pointing device, a mouse, a stylus, a touch sensitive panel (e.g., a touch pad or a touch screen), a gyroscope, an accelerometer, a position detector, camera, or an audio input device. A single component such as a touch screen may function as both an output device of media output component 704 and input device 708. Moreover, in some embodiments, supervisory device 304 includes more than one input device 708 for receiving input from user 706. For example, computer device may include a keyboard, a touch sensitive panel, and a scanner.

Supervisory device 304 includes a communication interface 710, which is communicatively couplable to a remote device such as supervisory device 304 and/or robotic vehicle 302. Communication interface 710 may include, for example, a wired or wireless network adapter or a wireless data transceiver for use with a mobile phone network (e.g., Global System for Mobile communications (GSM), Code Division Multiple Access (CDMA), 3G, 4G or Bluetooth) or other mobile data network (e.g., Worldwide Interoperability for Microwave Access (WIMAX)).

Figure 8:
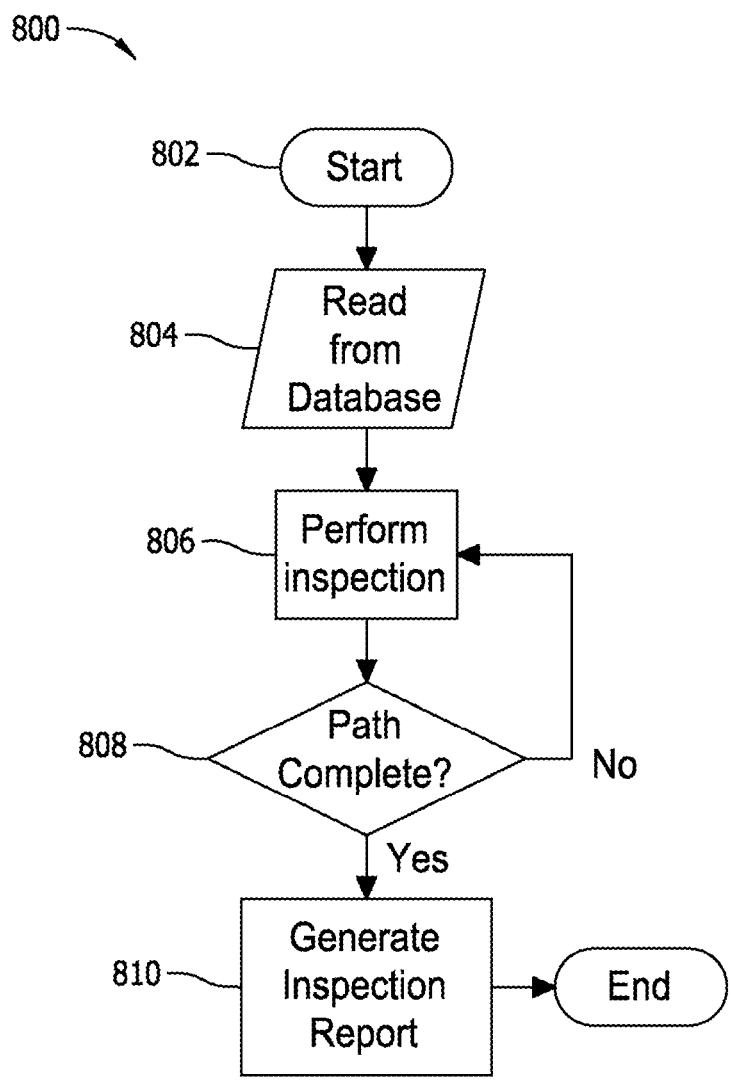
FIG. 8 is a flow diagram of an exemplary method for use in automated tracking of assets in a vehicle.

FIG. 8 is a flow diagram of an exemplary method 700 for use in automated asset tracking in a vehicle, such as in aircraft 200. Although, method 800 will be described with reference to aircraft 200 and system 300, method 800 may be used with aircraft other than aircraft 200 and systems other than system 300.

Method 800 begins at 802 when an operator 310 (shown in FIG. 3) initiates an inspection of aircraft 200 by robotic device 302 using supervisory device 304. In the exemplary embodiment, operator 310 will input the particular aircraft that is being inspected. In other embodiments, operator 310 may select the particular aircraft from a list of all possible aircraft.

At 802, information for the inspection is read from database 308 and transmitted to supervisory device 304. The information includes, for example, information about aircraft 200 (including a map of aircraft 200), assets that are being inspected/inventoried, an inspection log, information about robotic vehicle 302, etc. The information needed by robotic vehicle 302 to perform as described herein is transmitted from supervisory device 304 to robotic vehicle 302. In other embodiments, remote computing device 306 transmits the necessary information directly to robotic vehicle 302.

Operator 310 may view the received information on supervisory device 304. For example, operator may view inventory logs retrieved from database 308 for comparison to the inventory currently being created. In the exemplary embodiment, a current inventory checklist is displayed to operator 310 on supervisory device 304. The current inventory checklist displays all assets expected to be found within aircraft 200 by robotic vehicle 302. The current checklist indicates whether or not robotic vehicle 302 has yet located the particular asset 202, 204, or 206. If an unexpected asset, i.e. an asset that is not on the checklist, is located by robotic vehicle 302, the identification data for the unexpected asset is displayed in the current checklist with an indication that the asset is unknown or unexpected. In the exemplary embodiment, robotic vehicle 302 transmits such information to supervisory device 304 while it is performing its scan, and the information displayed to operator 310 via supervisory device 304 is continually updated. In other embodiments, robotic vehicle does not transmit the results to supervisory device 304 until it has completed its inspection of aircraft 200.

At step 806, robotic vehicle 302, after receiving the appropriate information from supervisory device 304 and/or remote computing device 306, performs its inspection of aircraft 200. Computing device 502 uses the received information to generate a navigation path through aircraft 200 and operates robotic platform 400 to traverse the navigation path. While moving along the navigation path, asset identification system 512 scans for the expected identification tags 212 associated with expected assets 202, 204, and 206. In the exemplary embodiment, asset identification system 512 scans for tags 212 in a fixed direction relative to robotic platform 400. For example, asset identification system 512 may scan for tags 212 ahead and to the right of robotic platform 400. In this embodiment, to complete a scan of aircraft 200 (by scanning for tags 212 on both the left and right side of aisle 124), robotic vehicle 302 must traverse a navigation path from a first end 312 (shown in FIG. 3) of aircraft 200 to a second end 314 (shown in FIG. 3) of aircraft 200 and back to first end 312. In other embodiments, asset identification system 512 scans for tags 212 by sweeping a scan in more than one direction. For example, asset identification system 512 may continuously scan from left to right in front of robotic vehicle 302. In another example, asset identification system 512 may aim its scan at the expected locations of assets 202, 204, and 206. In such non-fixed scanning embodiments, robotic vehicle 302 need only traverse a navigation path from first end 312 to second end 314 to complete a scan of aircraft 200. In the exemplary embodiment, robotic vehicle 302 continues to scan for assets 202, 204, and 206 until it has completed traveling the navigation path at 808. In other embodiments, robotic vehicle 302 may stop before it has completed the navigation path if, for example, all assets 202, 204, and 206 have been located.

Following completion of the navigation path by robotic vehicle 302, an inspection report is generated. The inspection report identifies the assets 202, 204, and 206 located by robotic vehicle 302, any unexpected items located, identifies any expected items that were not located, items that were found in a different location than expected, etc. Moreover, the inspection report includes notification of any assets 202, 204, or 206 that may be in need of maintenance, replacement, etc., based on data concerning the particular asset 202, 204, or 206 retrieved from its tag 212 and/or stored in database 308. For example, the inspection report may indicate that a fire extinguisher is due to be serviced based on a last service date stored in tag 212 and/or database 308. In the exemplary embodiment, the inspection report is generated by supervisory device 304. In other embodiments, the inspection report is generated by robotic device 302 or remote computing device 306. The inspection report is stored in database 308 for future reference including, for example, notifying maintenance personnel of needed repairs/maintenance, updating navigation/asset location maps for robotic vehicle 302, reporting missing assets that need to be replaced, statistical analysis, etc.

Figure 9:
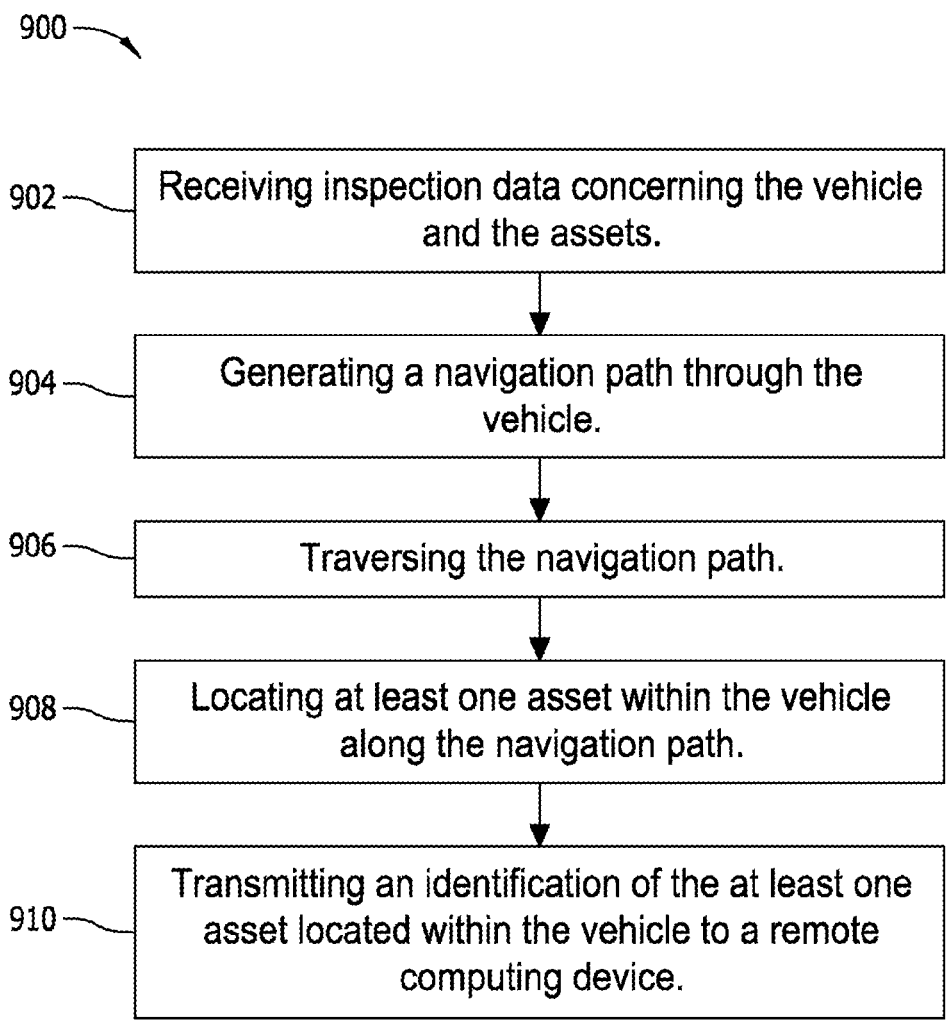
FIG. 9 is a flow diagram of another exemplary method for use in automated tracking of assets in a vehicle.

FIG. 9 is a flow diagram of an exemplary method 900 for use in automated tracking of assets in a vehicle, such as aircraft 200, utilizing a robotic vehicle, such as robotic vehicle 302. Method 900 includes receiving 902 inspection data concerning the vehicle and the assets. A navigation path is generated 904 thorough the vehicle. The robotic vehicle traverses 906 the navigation path and locates 908 at least one asset with the vehicle along the navigation path. An identification of the asset located within the vehicle is transmitted 910 to a remote computing device and stored in a database associated with the remote computing device.

Thus, exemplary embodiments may provide less labor intensive inventorying of assets within a vehicle. Moreover, some exemplary systems and methods may provide more accurate inventories than human performed inventories through the use of a robotic vehicle electronically identifying assets within the vehicle. Moreover, maintenance, repair, and/or expiration data information may be retrieved from the assets or from a remote database substantially simultaneously with the location of the assets within the vehicle. Furthermore, useful data, such as inventory results, maintenance data, repair data, etc., may be generated, stored, and/or retrieved in exemplary embodiments of the methods and systems described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in automated tracking of assets in an inspected vehicle utilizing a robotic vehicle, said method comprising:
   receiving, by the robotic vehicle, inspection data concerning the inspected vehicle and the assets, wherein the inspection data includes:
   a map of the inspected vehicle;
   identification of a plurality of assets expected to be in the inspected vehicle; and
   respective expected locations within the inspected vehicle of the plurality of assets;
   generating, by the robotic vehicle, a navigation path through the inspected vehicle based on the map of the inspected vehicle, the identification of the plurality of assets, and the respective expected locations of the plurality of assets, wherein the navigation path facilitates inspection of each of the respective expected locations of the plurality of assets;
   traversing, by the robotic vehicle, the navigation path;
   locating, by the robotic vehicle, at least one asset within the inspected vehicle along the navigation path;
   receiving maintenance data for the at least one asset; and
   transmitting, by the robotic vehicle, an identification of the at least one asset located within the inspected vehicle to a remote computing device for storage in a database associated with the remote computing device.

2. The method of claim 1, wherein said locating at least one asset within the inspected vehicle along the navigation path comprises locating at least one asset within the inspected vehicle using radio frequency identification (RFID).

3. The method of claim 1, further comprising determining if all assets expected to be in the inspected vehicle have been located.

4. The method of claim 1, further comprising determining if the at least one asset that was located is an expected asset.

5. The method of claim 4 wherein said determining if the at least one asset that was located is an expected asset comprises determining if the at least one asset is of a same type of asset as the expected asset.

6. The method of claim 5 wherein said determining if the at least one asset that was located is an expected asset comprises determining if the at least one asset is of a same type of asset as the expected asset and has a same particular identification as the expected asset.

7. The method of claim 1, further comprising generating an inspection report identifying the at least one asset located within the inspected vehicle, and wherein storing the identification of the at least one asset in a database associated with the remote computing device comprises storing the inspection report in the database.

8. The method of claim 7, wherein said generating an inspection report comprises generating an inspection report listing all of a plurality of assets expected to be located within the inspected vehicle, and identifying which of the plurality of assets were located within the inspected vehicle.

9. The method of claim 8, wherein said generating an inspection report comprises generating an inspection report identifying a location within the inspected vehicle at which each of the plurality of assets were located within the inspected vehicle.

10. The method of claim 1, wherein receiving the inspection data including the map of the inspected vehicle further comprises receiving a predetermined map of the inspected vehicle.

11. A system for tracking assets in an inspected vehicle, said system comprising:
   a robotic vehicle comprising:
      a navigation system;
      an asset location system;
      a communications interface; and
      a computing device coupled to the navigation system, the asset location system, and the communications interface, said computing device programmed to:
         receive inspection data concerning the inspected vehicle and assets via the communications interface, wherein the inspection data includes:
            a map of the inspected vehicle;
            identification of a plurality of assets expected to be in the inspected vehicle; and
            respective expected locations within the inspected vehicle of the plurality of assets;
         generate a navigation path through the inspected vehicle based on the map of the inspected vehicle, the identification of the plurality of assets, and the respective expected locations of the plurality of assets, wherein the navigation path facilitates inspection of each of the respective expected locations of the plurality of assets;
         traverse the navigation path through the inspected vehicle using the navigation system;
         locate at least one asset within the inspected vehicle along the navigation path using the asset location system;
         receive maintenance data for the at least one asset; and
         transmit an identification of the at least one asset located within the inspected vehicle to a remote computing device using the communications interface for storage in a database associated with the remote computing device.

12. The system of claim 11, further comprising the remote computing device, the remote computing device programmed to transmit the inspection data to said robotic vehicle via the communications interface and receive the identification of the at least one asset from said robotic vehicle via the communications interface.

13. The system of claim 11, wherein the asset location system comprises a radio frequency identification (RFID) transceiver configured to transmit radio frequency signals and receive a response from a response from an RFID tag attached to each of the assets.

14. The system of claim 11, wherein the communications interface comprises a wireless network communication transceiver.

15. A robotic vehicle for use in automated tracking of assets in an inspected vehicle, said robotic vehicle comprising:
   a robotic platform configured to permit the robotic vehicle to move within an environment;
   a navigation system mounted to said robotic platform to guide said robotic platform within the inspected vehicle;
   an asset identification system mounted to said robotic platform to identify a plurality of assets within the inspected vehicle;
   a communications interface mounted to said robotic platform for communicating with a remote computing device; and
   a computing device mounted to said robotic platform and coupled to said navigation system, said asset identification system, and said communications interface, said computing device programmed to:
      generate a navigation path through the inspected vehicle based on a map of the inspected vehicle, identification of the plurality of assets expected to be in the inspected vehicle, and respective expected locations within the inspected vehicle of the plurality of assets, wherein the navigation path facilitates inspection of each of the respective expected locations of the plurality of assets,
      cause said robotic platform to navigate the navigation path through the inspected vehicle,
      use said identification system to identify at least one asset of the plurality of assets,
      receiving maintenance data for the at least one asset, and
      use said communications interface to transmit an identification of the at least one asset to the remote computing device for storage in a database associated with the remote computing device.

16. The robotic vehicle of claim 15, wherein said asset identification system comprises a radio frequency identification (RFID) transceiver configured to transmit radio frequency signals and receive a response from a response from an RFID tag attached to each of the assets.

17. The robotic vehicle of claim 15, wherein said communications interface comprises a wireless network communication transceiver.

18. The robotic vehicle of claim 15, wherein said navigation system comprises at least one exteroreceptive sensor for sensing an environment around said robotic vehicle.

19. The robotic vehicle of claim 15, wherein said computing device is further programmed to generate an inspection report indicating which assets were identified in the inspected vehicle for storage in the database associated with the remote computing device.

* * * * *